United States Patent
Eberlein

(10) Patent No.: US 7,202,694 B2
(45) Date of Patent: Apr. 10, 2007

(54) CURRENT SENSING STRUCTURE FOR INTEGRATED POWER SWITCHES

(75) Inventor: Matthias Eberlein, Gilching (DE)

(73) Assignee: Dialog Semiconductor GmbH, Kirchheim/Teck-Nabern (DE)

( * ) Notice: Subject to any disclaimer, the term of this patent is extended or adjusted under 35 U.S.C. 154(b) by 270 days.

(21) Appl. No.: 11/039,137

(22) Filed: Jan. 19, 2005

(65) Prior Publication Data

US 2006/0158158 A1  Jul. 20, 2006

(30) Foreign Application Priority Data

Jan. 14, 2005  (EP) ................... 05368004

(51) Int. Cl.
*G01R 31/26* (2006.01)
(52) U.S. Cl. ............... 324/769; 324/765; 363/70; 363/80; 323/282
(58) Field of Classification Search ............... 324/430, 324/522, 713, 767, 765, 769; 363/70, 16, 363/80, 89, 126; 323/282–285, 313–316
See application file for complete search history.

(56) References Cited

U.S. PATENT DOCUMENTS

| | | | | |
|---|---|---|---|---|
| 5,028,861 A | * | 7/1991 | Pace et al. | ................... 323/222 |
| 5,532,918 A | | 7/1996 | Mayrand et al. | ............... 363/89 |
| 5,612,610 A | * | 3/1997 | Borghi et al. | ................ 323/222 |
| 5,694,040 A | * | 12/1997 | Plagens | .................... 324/207.2 |
| 6,504,351 B2 | | 1/2003 | Eagar et al. | ................. 323/282 |
| 6,507,227 B2 | * | 1/2003 | Genova et al. | ............. 327/109 |
| 6,731,524 B2 | | 5/2004 | Elek et al. | ..................... 363/70 |

OTHER PUBLICATIONS

"CMOS Analog Circuit Design", by Allen et al., Oxford University press 1987, p. 248.

* cited by examiner

*Primary Examiner*—Rajnikant B. Patel
(74) *Attorney, Agent, or Firm*—Saile Ackerman LLC; Stephen B. Ackerman

(57) ABSTRACT

Circuits and methods to sense the current through a coil of an integrated switching converter, applicable to boost and to buck converters, have been achieved. The present invention uses a "replica biasing" technique to avoid a resistor for current measurement. The current through a pass device is mirrored into a replica, having a scale of n and being much smaller in size, of said pass device. The current through the replica is mirrored to another branch of the circuit and back again to achieve a fast stabilization of the current. The current through the replica is mirrored again to an output branch of the circuit, which conducts exactly a fraction 1/n of the current flowing through the pass device. The self-biasing current loop of the invention adapts quickly to the actual current level through the pass device of the switching converter. Accuracies better than 5% are achieved over a wide range of dynamic range.

22 Claims, 4 Drawing Sheets

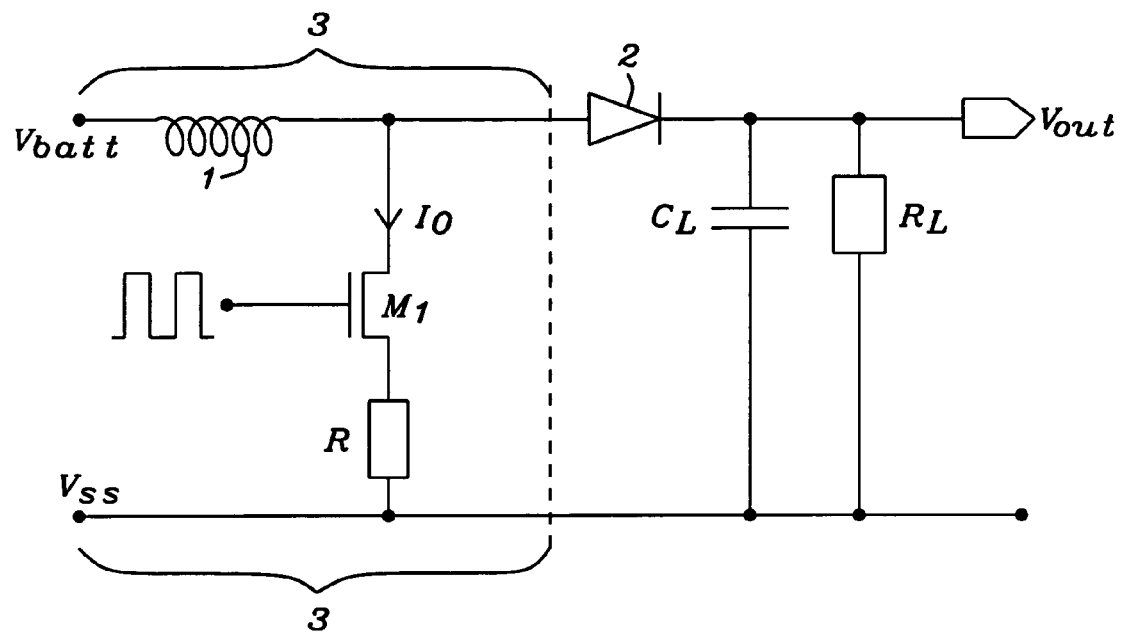
*FIG. 1 — Prior Art*
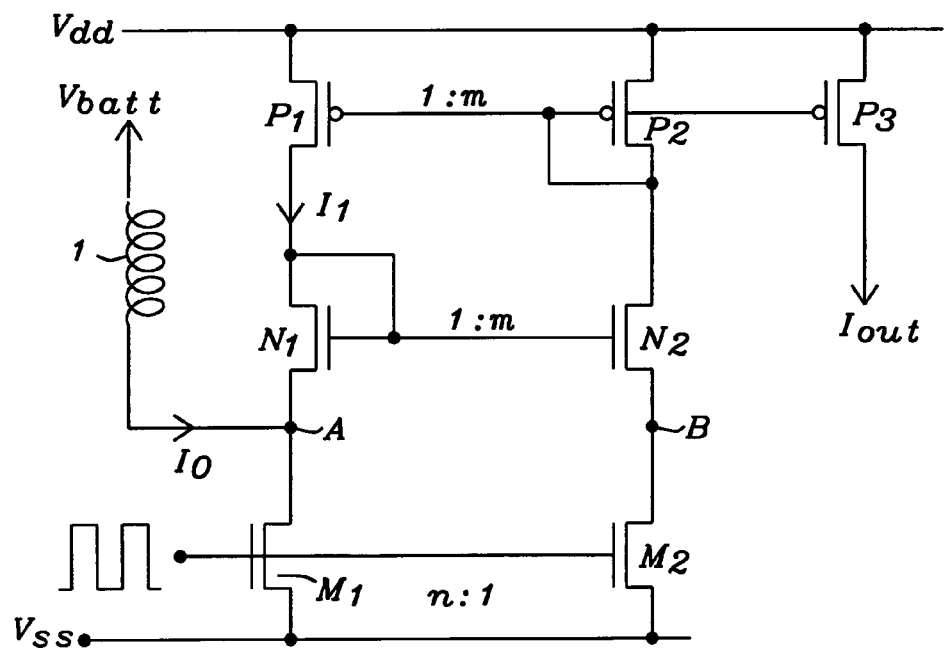
*FIG. 2*

Start

| Provide a circuitry comprising a NMOS pass device having a current mirror replica, wherein the current to be measured is flowing through said pass device, an NMOS current mirror and a PMOS current mirror wherein all said current mirrors are in parallel, and an output transistor mirroring the current through said pass device replica | ~40 |

↓

| Mirror current through said NMOS pass device to said replica of said NMOS pass device | ~41 |

↓

| Stabilize the current through said NMOS replica | ~42 |

↓

| Mirror said stabilized current to said output transistor | ~43 |

↓

| Use current through said output transistor as a correlated measure of the current to be measured through said NMOS pass device | ~44 |

FIG. 4

CURRENT SENSING STRUCTURE FOR INTEGRATED POWER SWITCHES

BACKGROUND OF THE INVENTION (1) Field of the Invention

The invention relates to electrical power supplies, and more particularly to sensing the current through coils of switching regulators as e.g. boost or buck converters.

(2) Description of the Prior Art

Integrated switching regulators as e.g. boost or buck converters usually have a current control loop requiring accurate sensing of the actual current through an external coil during operation. Usually a small resistor is therefore connected in series to a large MOSFET switch, which conducts this current during on state. FIG. 1 prior art shows a schematic of such a conventional prior art configuration using an NMOS switch. The circuit of FIG. 1 comprises an external coil 1, a large MOSFET switch M1, a sense resistor R, a diode 2, and a capacitor $C_L$ and a resistor $R_L$, both representing a load. The part 3 on the left side represents the inductor and the current sense function of the integrated switching converter. The current $I_0$ flows through the coil 1, the MOSFET switch M1, and through the resistor R during on state of the MOSFET switch M1.

Using resistor R for current $I_0$ sensing introduces inaccuracies, especially when integrated on chip, and reduces efficiency. As a consequence a larger pass-device M1 area is necessary, too There are patents known dealing with the current sensing of switching converters:

U.S. Pat. No. 6,731,524 to Elek et al. describes a power system including a plurality of power supply units ("PSUs"), each PSU having an output that is coupled to the output of other PSUs in the power system. Each PSU includes a power factor correction ("PFC") assembly for receiving an AC input and generating a first DC output. A DC/DC converter assembly is coupled to the PFC assembly, and receives the first DC output and generates a second regulated DC output. A control assembly is coupled to the DC/DC converter assembly, and is operative to monitor the DC/DC converter assembly output and in response thereto provide control signals to the DC/DC converter assembly. A preferred current sense circuit comprises a thevenin resistor that is coupled into the output path of the DC/DC converter and associated circuitry that generates a current measurement that is proportional to the output current flowing through the DC/DC converter.

U.S. Pat. No. 6,504,351 to Eagar et al. discloses systems and methods for reducing a reverse recovery current through a body diode in a synchronous switching transistor. An inductor is coupled in the commutation path of the body diode of the synchronous switching transistor. The inductor slows the rate of increase of the reverse recovery current to reduce avalanche effects in the synchronous switching transistor. This reduces the peak reverse recovery current through the body diode of the synchronous switching transistor when the body diode commutates, thereby reducing power dissipation in the main switching transistor. An inductor may be coupled to both switching transistors so that power dissipation is reduced if the regulator is operated as a buck or boost regulator. A diode and a reverse recovery switcher may be coupled to the inductor to transfer energy in the inductor back to the input or output capacitor after the body diode commutates. A current comparator monitors the current through the sense resistor in a current mode controller.

U.S. Pat. No. 5,532,918 to Mayrand et al. discloses a high-power-factor power supply having a full-wave rectifier for rectifying an AC line voltage, a power regulator including switch means responsive to a control signal for controlling the application of the rectifier output to a load; and a control circuit for producing a switching control signal. The control signal includes a pair of AC line detectors: a first connected in a closed-loop automatic gain control arrangement, and the other connected in an open-loop arrangement. The control circuit initially produces a current demand reference signal that is directly related to the difference between the power supply DC output voltage and a self-generated constant reference, and to the waveform shape of the AC line voltage, and is inversely related to magnitude changes of the AC line voltage. The control signal then produces the switching control signal in response to both the current demand reference signal and the current flowing in the power supply. The invention avoids the square law dependency of prior art high-power-factor power supplies, can operate over a broad input dynamic range, and is "self-biasing" in that the power supply itself generates any needed reference voltages. In response to a current sense demand reference and a current sense signal from a power regulator indicative of the current flowing through a sensor resistor, a control circuit generates the switching control signal.

Furthermore Philip E. Allen and Douglas R. Holberg teach in "CMOS Analog Circuit Design", Oxford University press 1987, on page 248 a current loop to create a current out of a reference voltage, here a base-emitter voltage drop and a resistor.

SUMMARY OF THE INVENTION

A principal object of the present invention is to sense the current through a coil of an integrated switching converter without the power losses caused by a resistor.

Another principal object of the present invention is to achieve a method for a fast and precise measurement of the current through the coil of an integrated switching converter.

In accordance with the objects of this invention a circuit to sense the current through an inductor of an integrated switching boost converter using an NMOS pass device has been achieved. The circuit invented comprises, firstly, a first branch, wherein one terminal is connected to a battery voltage and the other terminal is connected to the drain of said NMOS pass device in a second branch, wherein said first branch is comprising said inductor. Second, the circuit has a second branch comprising a PMOS transistor, an NMOS transistor, and an NMOS pass device, wherein said first branch is connected to the drain of said NMOS pass device, the source of the NMOS pass device is connected to $V_{SS}$ voltage, the gate of the NMOS pass device is receiving pulses controlling the NMOS pass device, the drain of the NMOS pass device is connected to the source of said NMOS transistor, the drain of said NMOS transistor is connected to the drain of said PMOS transistor and the source of said PMOS transistor is connected to $V_{DD}$ voltage. Third, the circuit has a third branch comprising a PMOS transistor, an NMOS transistor, and an NMOS device, wherein said NMOS device is a replica, smaller in size, of said NMOS pass device of the second branch, wherein the source of the NMOS device is connected to $V_{SS}$ voltage, the gate of the NMOS device is connected to the gate of said NMOS pass device of the second branch, the drain of the NMOS device is connected to the source of said NMOS transistor, the gate of said NMOS transistor is connected to gate and the drain of said NMOS transistor of the second branch, the drain of said NMOS transistor is connected to the drain and to the gate of said PMOS transistor, the gate of said PMOS transistor is furthermore connected to the gate of the PMOS transistor of the second branch, and the source of said PMOS transistor is connected to $V_{DD}$ voltage. Finally the circuit has a fourth branch comprising a PMOS transistor, wherein its gate is connected to the gates of the PMOS transistors of the second and third branch, its source is connected to $V_{DD}$ voltage and its drain is providing an output current being proportional to the current through the first branch.

In accordance with the objects of this invention a circuit to sense the current through an inductor of an integrated switching buck switching converter using a PMOS pass device has been achieved. The circuit invented comprises, firstly, a first branch, wherein one terminal is connected to an output voltage and the other terminal is connected via said inductor to the drain of said PMOS pass device in a second branch. Second, the circuit invented comprises a second branch comprising a PMOS transistor, an NMOS transistor, and an PMOS pass device, wherein said first branch is connected to the drain of said PMOSFET pass device, the source of the PMOS pass device is connected to $V_{DD}$ voltage, the gate of the PMOS pass device is receiving pulses controlling the PMOS pass device, the drain of the PMOS pass device is connected to the source of said PMOS transistor, the drain of said PMOS transistor is connected to the drain of said NMOS transistor and the source of said NMOS transistor is connected to $V_{SS}$ voltage. Third, the circuit invented has a third branch comprising a PMOS transistor, an NMOS transistor, and an PMOS device, wherein said PMOS device is a replica, smaller in size, of said PMOS pass device of the second branch, wherein the source of the PMOS device is connected to $V_{DD}$ voltage, the gate of the PMOS device is connected to the gate of said PMOS pass device of the second branch, the drain of the PMOS device is connected to the source of said PMOS transistor, the gate of said PMOS transistor is connected to the gate and to the drain of said PMOS transistor of the second branch, the drain of said PMOS transistor of the third branch is connected to the drain and to the gate of said NMOS transistor, the gate of said NMOS transistor is furthermore connected to the gate of said NMOS transistor of the second branch, and the source of said NMOS transistor of the third branch is connected to $V_{SS}$ voltage. Finally the circuit has a fourth branch comprising an NMOS transistor, wherein its gate is connected to the gates of the NMOS transistors of the second and third branch, its source is connected to $V_{DD}$ voltage and its drain is providing an output current being proportional to the current through the first branch.

In accordance with the objects of this invention a method to sense the current through an inductor of an integrated boost converter using an NMOS pass device has been achieved. The method invented comprises, firstly, to provide a circuitry having four branches, wherein a first branch is conducting the current to be measured, a second branch comprises at least one PMOS transistor, one NMOS transistor, and an NMOS pass device, wherein said current to be measured is flowing through said NMOS pass device and wherein the current through said at least one PMOS transistor and at least one NMOS transistor of the second branch is negligible small compared to the current to be measured, a third branch comprises the same number and type of transistors as said second branch and an NMOS device, wherein each of said transistors of the third branch is forming a current mirror with a correspondent transistor of the second branch and wherein said NMOS device is a replica of the NMOS pass device of the second branch having an n-times smaller size than said NMOS pass device and wherein both said NMOSFET devices are forming a current mirror, and a fourth branch comprises another PMOS transistor conducting the output current of the current sensing system wherein said PMOS transistor of the fourth branch is forming a current mirror with one correspondent transistor of each the third and second branch. The following steps of the method are to mirror the current through said NMOS pass device to said NMOS device of the third branch being a replica of said NMOS pass device, to stabilize the current of said third branch quickly by mirroring this current to the second branch and mirroring back from the second branch to the third branch wherein the current through the current mirror transistors of the second branch is negligible small compared to the current through said NMOS pass device, to mirror the current of the third branch to said PMOS transistor of said fourth branch, and to use the current of the fourth branch as a linearly correlated measure of the current to be measured of the first branch.

In accordance with the objects of this invention a method to sense the current through an inductor of an integrated buck converter using a PMOS pass device has been achieved. The method invented comprises, firstly, to provide a circuitry having four branches, wherein a first branch is conducting the current to be measured, a second branch comprises at least one PMOS transistor, one NMOS transistor, and a PMOS pass device, wherein said current to be measured is flowing through said PMOS pass device and wherein the current through said at least one PMOS transistor and at least one NMOS transistor of the second branch is negligible small compared to the current to be measured, a third branch comprises the same number and type of transistors as said second branch and a PMOS device, wherein each of said transistors of the third branch is forming a current mirror with a correspondent transistor of the second branch and wherein said PMOS device is a replica of the PMOS pass device of the second branch having an n-times smaller size than said PMOS pass device and wherein both said PMOSFET devices are forming a current mirror, and a fourth branch comprises another NMOS transistor conducting the output current of the current sensing system wherein said NMOS transistor of the fourth branch is forming a current mirror with one correspondent transistor of each the third and second branch. The following steps of the method invented are to mirror the current through said PMOS pass device to said PMOS device of the third branch being a replica of said PMOS pass device, to stabilize the current of said third branch quickly by mirroring this current to the second branch and mirroring back from the second branch to the third branch, wherein the current through the current mirror transistors of the second branch is negligible small compared to the current through said PMOS pass device, to mirror the current of the third branch to said NMOS transistor of said fourth branch, and to use current of the fourth branch as a linearly correlated measure of the current to be measured of the first branch.

BRIEF DESCRIPTION OF THE DRAWINGS

In the accompanying drawings forming a material part of this description, there is shown:

FIG. 1 prior art shows a principal schematic of an integrated switching converter using a resistor to sense the current through a coil.

FIG. 2 illustrates a schematic of a current sensing structure of the present invention used for a boost converter.

FIG. 4 shows a flowchart of the method invented to sense the current through a coil of a boost converter efficiently.

DESCRIPTION OF THE PREFERRED EMBODIMENTS

Figure 3:
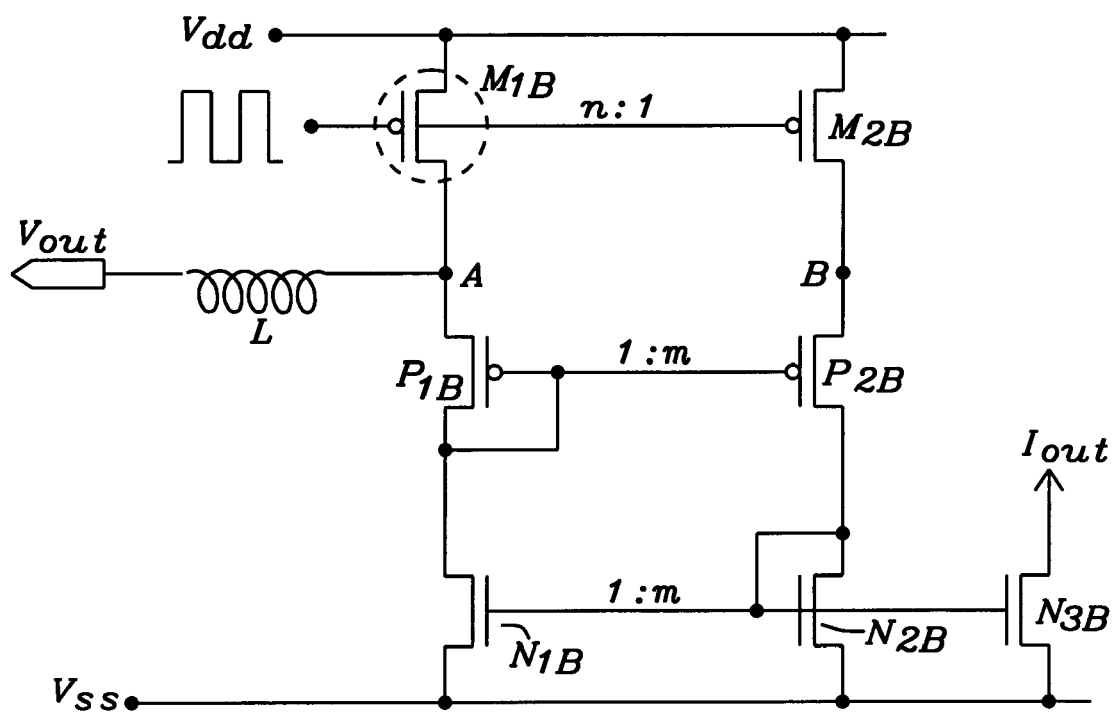
FIG. 3 illustrates a schematic of a current sensing structure of the present invention used for a buck converter.

The preferred embodiments of the present invention disclose novel circuits and methods used for current sensing of integrated switching converters. It has to be understood that the structure of the circuits could be used for a multitude of different current sensing applications.

FIG. 2 shows, as example of the circuit invented, a schematic of the switching and current sensing part of an integrated switching boost converter. The invention uses a "replica biasing" technique to avoid a resistor for current measurement as shown in FIG. 1 prior art. In the circuit shown in FIG. 2 the current through the pass device M1 is sensed by biasing another MOSFET device M2 under similar conditions like pass device M1 but with scaled dimensions. Similar conditions mean in this context that gate, source and drain voltages of pass device and MOSFET device M2 are nearly equal. In the case of the present invention the gate and source connections are identical anyway and the self-biased loop automatically adjusts an operating point where the drain voltages are about the same. In a preferred embodiment the MOSFET device M2 is n-times smaller than the pass device M1. A self-biased current loop adapts to changing currents within pass device M1 during on state. Preferably the pass device M1 is an internal device because this way it is easier to achieve matching conditions between M1 and M2. In one embodiment of the invention an external device M1 has been used due to very high load conditions and no significant problems showed.

The voltage drop over a MOSFET switch as M1 conducting large currents can be seen as a constant voltage source. This is especially true if the loop current 11 through transistors P1 and N1 is negligible compared to the current $I_0$ through the external coil 1, which is an important design aspect of the invention. The replica device M2, connected to M1 in a current mirror configuration having a scaling factor n, must be matched to M1 and has a much smaller size than M1. Scaling factors n in the order of magnitude between 100 and 5000 are practicable. Since it carries a small, variable current it behaves like a resistor. The current through M2 is mirrored by PMOS transistors P2 and P1. Depending on the value of the current $I_0$ through the coil 1, which creates a voltage drop at node A, a respective current is again reproduced through the current mirror formed by NMOS transistors N1 and N2. By a fast, iterative process this self-biasing current loop reaches very quickly an equilibrium wherein M2 conducts exactly a fraction 1/n of the current flowing through M1. In this state nodes A and B have the same voltage. The two current mirrors formed by P1/P2 and by N1/N2 stabilize very fast the current through M2 by providing a negative feedback. Therefore the output current $I_{OUT}$ mirrored into PMOS transistor P3 represents a measurement value of the actual coil current $I_0$. In order to achieve an accurate measurement it is necessary that both current mirrors, formed by NMOS transistors N1/N2 respective PMOS transistors P1/P2 have the same ratio m. This ratio can have arbitrary values as long as the current $I_1$ remains negligible versus the current $I_0$ through the coil 1.

It is obvious to those skilled in art that the NMOS switches described in the boost converter of FIG. 2 could be replaced PMOS switches by exchanging VSS voltage with VDD voltage and vice versa. Such an implementation would not very common since it results in an output voltage referenced to $V_{DD}$ instead to $V_{SS}$ voltage.

The same principles as shown above can be applied for PMOSFET switches as being used e.g. in buck converters instead of the NMOSFET switches shown in the boost converter of FIG. 2. FIG. 3 shows a buck converter having a PMOSFET pass device. The PMOSFET switches used for this buck converter of FIG. 3 are connected to $V_{DD}$ voltage while the NMOSFET switches of the boost converter of FIG. 2 are connected to $V_{SS}$ voltage.

The circuit of the buck converter of FIG. 3 has a correspondent structure as the boost converter shown in FIG. 2. The source of the PMOS pass transistor $M_{1B}$ is connected to $V_{DD}$ voltage, the gate of pass device $M_{1B}$ is connected to the gate of a PMOS device $M_{2B}$ mirroring the current through $M_{1B}$ in a scale of 1:n wherein $M_{2B}$ is n-times smaller than $M_{1B}$. Scaling factors n in the order of magnitude between 100 and 5000 are practicable. The drain of $M_{1B}$ is connected to the output voltage $V_{OUT}$ of the buck converter via an inductor L and is connected to the source of the PMOS transistor $P_{1B}$. The gate of PMOS transistor $P_{1B}$ is connected to the gate of PMOS transistor $P_{2B}$ mirroring the current through transistor $P_{1B}$ using an arbitrary scale 1:m. The source of $P_{2B}$ is connected to the drain of transistor $M_{2B}$. The drain of transistor $P_{1B}$ is connected is connected to the gate of $P_{1B}$ and to the drain of NMOS transistor $N_{1B}$. The gate of transistor $N_{1B}$ is connected to the gate of NMOS transistor $N_{2B}$, to the drain of transistor $N_{2B}$, and to the drain of PMOS transistor $P_{2B}$. NMOS transistor $N_{2B}$ is mirroring the current through transistor $N_{1B}$ using the same scale 1:m as the current mirror formed by $P_{1B}$ and $P_{2B}$. The sources of NMOS transistors $N_{1B}$ and $N_{2b}$ are connected to $V_{SS}$ voltage. The gate of transistor $N_{3B}$ is connected to the gates of $N_{2B}$ and of $N_{1B}$ mirroring the current through $N_{2B}$. The source of $N_{3B}$ is connected to $V_{SS}$ voltage, the drain of $N_{3B}$ provides the output current $I_{OUT}$ of the current sensing circuit of the present invention. A diode D is connected between the drain of $M_{1B}$ and $V_{SS}$ voltage. The resistor $R_L$ and capacitor $C_L$ represent the load of the buck converter shown. Said current $I_{OUT}$ is linearly correlated to the current to be measured through the coil L.

FIG. 4 shows a flowchart of a related method to measure the current through a pass device of a boost converter. The first step 40 describes the provision of a circuitry having four branches, wherein a first branch is conducting the current to be measured, a second branch comprises at least one PMOS transistor, one NMOS transistor and an NMOSFET pass device, wherein said current to be measured is flowing through said NMOSFET pass device and the current through said at least two transistors is negligible small compared to the current to be measured, a third branch comprises the same number and type of transistors as said second branch and an NMOSFET device, wherein each of said transistors of the third branch is forming a current mirror with a correspondent transistor of the second branch and wherein said NMOSFET device is a replica of said NMOSFET pass device of the second branch having an n-times smaller size than said NMOSFET pass device and wherein both NMOS-FETs are forming a current mirror, and a fourth branch comprises another PMOS transistor conducting the output current of the current sensing circuit and wherein said transistor of the fourth branch is forming a current mirror with one correspondent PMOS transistor of each the third and second branch. In the second step 41 the current through said NMOSFET pass device is mirrored to said NMOSFET device of the third branch being a replica of said NMOSFET pass device. The following step 42 describes the quick stabilization of the current of said third branch by mirroring this current to the second branch and mirroring back from the second branch to the third branch wherein the current through the current mirror transistors of the second branch is negligible small compared to the current through said NMOSFET pass device. In the next step 43 the current of the third branch is mirrored to said PMOS transistor of the fourth branch and in the last step 44 the current of the fourth branch is used as a linearly correlated measure of the current to be measured of the first branch.

Figure 5:
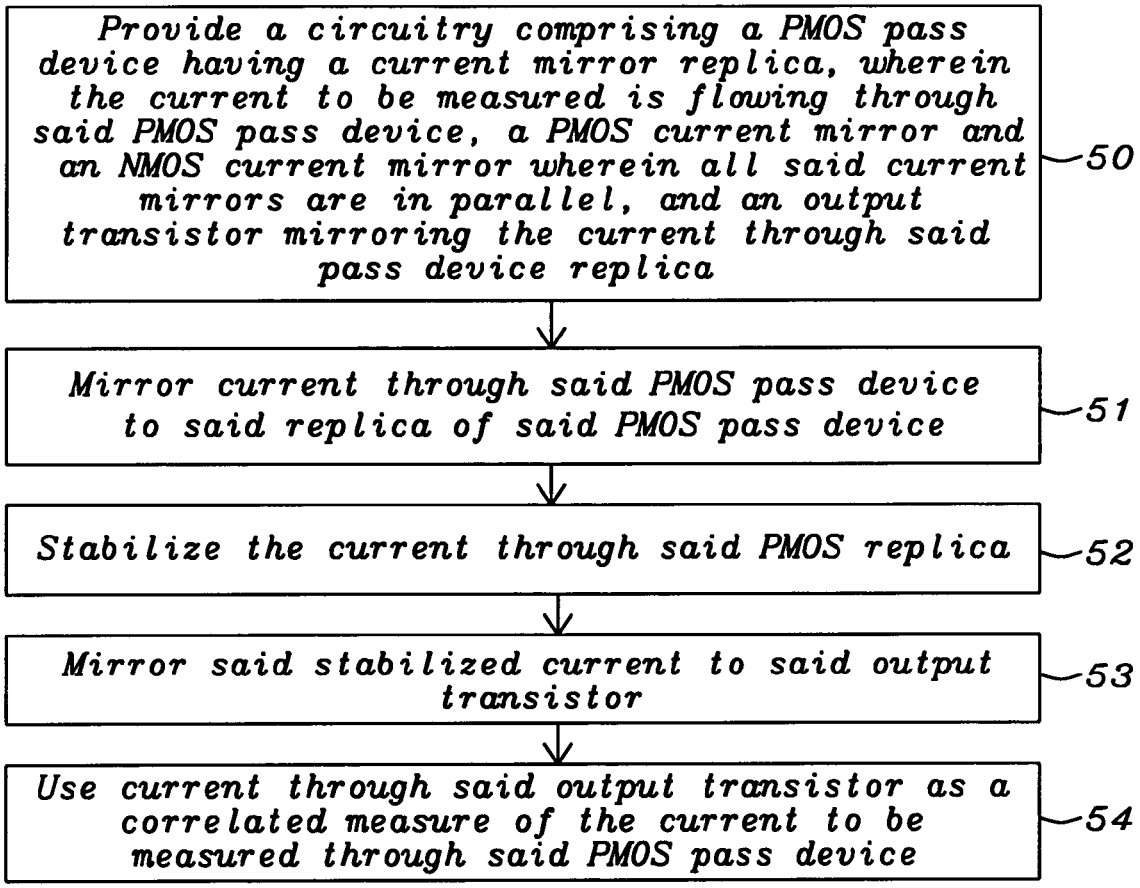
FIG. 5 shows a flowchart of the method invented to sense the current through a coil of a buck converter efficiently.

FIG. 5 shows a flowchart of a related method to measure the current through a pass device of a buck converter. The first step 50 describes the provision of a circuitry having four branches, wherein a first branch is conducting the current to be measured, a second branch comprises at least one PMOS transistor, one NMOS transistor and an PMOSFET pass device, wherein said said current to be measured is flowing through said PMOSFET pass device and the current through said at least two transistors is negligible small compared to the current to be measured, a third branch comprises the same number and type of transistors as said second branch and an PMOSFET device, wherein each of said transistors of the third branch is forming a current mirror with a correspondent transistor of the second branch and wherein said PMOSFET device is a replica of said PMOSFET pass device of the second branch having an n-times smaller size than said PMOSFET pass device and wherein both PMOSFETs are forming a current mirror, and a fourth branch comprises another NMOS transistor conducting the output current of the current sensing circuit and wherein said transistor of the fourth branch is forming a current mirror with one correspondent NMOS transistor of each the third and second branch. In the second step 51 the current through said PMOSFET pass device is mirrored to said PMOSFET device of the third branch being a replica of said PMOSFET pass device. The following step 52 describes the quick stabilization of the current of said third branch by mirroring this current to the second branch and mirroring back from the second branch to the third branch wherein the current through the current mirror transistors of the second branch is negligible small compared to the current through said PMOSFET pass device. In the next step 53 the current of the third branch is mirrored to said NMOS transistor of the fourth branch and in the last step 54 the current of the fourth branch is used as a linearly correlated measure of the current to be measured of the first branch.

In summary the circuits and the methods of the present invention achieve a very fast adaptation to the actual current level within the MOSFET pass devices M1 or respective M1B provided by the self-biasing current loop and thus a very fast measurement is achieved. Furthermore the structure invented consumes a very small current itself that is proportional to the current to be measured. Therefore the power efficiency is nearly 100% and constant, even for low currents through the coil. The accuracy of the measurement depends only on the matching properties of the pass device M1 and its replica M2 and not on absolute values, which is very favorable in integrated circuits. The accuracy of the measurement is better than 5% over a wide dynamic range.

While the invention has been particularly shown and described with reference to the preferred embodiments thereof, it will be understood by those skilled in the art that various changes in form and details may be made without departing from the spirit and scope of the invention.

What is claimed is:

1. A circuit to sense the current through an inductor of an integrated switching boost converter using an NMOS pass device comprises:
    a first branch, wherein one terminal is connected to a battery voltage and the other terminal is connected to the drain of said NMOS pass device in a second branch, wherein said first branch is comprising said inductor;
    a second branch comprising a PMOS transistor, an NMOS transistor, and an NMOS pass device, wherein said first branch is connected to the drain of said NMOS pass device, the source of the NMOS pass device is connected to $V_{SS}$ voltage, the gate of the NMOS pass device is receiving pulses controlling the NMOS pass device, the drain of the NMOS pass device is connected to the source of said NMOS transistor, the drain of said NMOS transistor is connected to the drain of said PMOS transistor and the source of said PMOS transistor is connected to $V_{DD}$ voltage;
    a third branch comprising a PMOS transistor, an NMOS transistor, and an NMOS device, wherein said NMOS device is a replica, smaller in size, of said NMOS pass device of the second branch, wherein the source of the NMOS device is connected to $V_{SS}$ voltage, the gate of the NMOS device is connected to the gate of said NMOS pass device of the second branch, the drain of the NMOS device is connected to the source of said NMOS transistor, the gate of said NMOS transistor is connected to gate and the drain of said NMOS transistor of the second branch, the drain of said NMOS transistor is connected to the drain and to the gate of said PMOS transistor, the gate of said PMOS transistor is furthermore connected to the gate of the PMOS transistor of the second branch, and the source of said PMOS transistor is connected to $V_{DD}$ voltage; and
    a fourth branch comprising a PMOS transistor, wherein its gate is connected to the gates of the PMOS transistors of the second and third branch, its source is connected to $V_{DD}$ voltage and its drain is providing an output current being proportional to the current through the first branch.

2. The circuit of claim 1 wherein said inductor is a coil.

3. The circuit of claim 2 wherein said coil is an external coil.

4. The circuit of claim 1 wherein said NMOS pass device is an external device.

5. The circuit of claim 1 wherein said NMOS pass device and its NMOS replica are both NMOSFETs.

6. A circuit to sense the current through an inductor of an integrated buck switching converter using a PMOS pass device comprises:
    a first branch, wherein one terminal is connected to an output voltage and the other terminal is connected via said inductor to the drain of said PMOS pass device in a second branch;
    a second branch comprising a PMOS transistor, an NMOS transistor, and an PMOS pass device, wherein said first branch is connected to the drain of said PMOSFET pass device, the source of the PMOS pass device is connected to $V_{DD}$ voltage, the gate of the PMOS pass device is receiving pulses controlling the PMOS pass device, the drain of the PMOS pass device is connected to the source of said PMOS transistor, the drain of said PMOS transistor is connected to the drain of said NMOS transistor and the source of said NMOS transistor is connected to $V_{SS}$ voltage;

a third branch comprising a PMOS transistor, an NMOS transistor, and an PMOS device, wherein said PMOS device is a replica, smaller in size, of said PMOS pass device of the second branch, wherein the source of the PMOS device is connected to $V_{DD}$ voltage, the gate of the PMOS device is connected to the gate of said PMOS pass device of the second branch, the drain of the PMOS device is connected to the source of said PMOS transistor, the gate of said PMOS transistor is connected to the gate and to the drain of said PMOS transistor of the second branch, the drain of said PMOS transistor of the third branch is connected to the drain and to the gate of said NMOS transistor, the gate of said NMOS transistor is furthermore connected to the gate of said NMOS transistor of the second branch, and the source of said NMOS transistor of the third branch is connected to $V_{SS}$ voltage; and a fourth branch comprising an NMOS transistor, wherein its gate is connected to the gates of the NMOS transistors of the second and third branch, its source is connected to $V_{DD}$ voltage and its drain is providing an output current being proportional to the current through the first branch.

7. The circuit of claim 6 wherein said inductor is a coil.

8. The circuit of claim 7 wherein said coil is an external coil.

9. The circuit of claim 6 wherein said PMOS pass device is an external device.

10. The circuit of claim 6 wherein said PMOS pass device and its PMOS replica are both PMOSFETs.

11. A method to sense the current through an inductor of an integrated boost converter using an NMOS pass device is comprising:

provide a circuitry having four branches, wherein a first branch is conducting the current to be measured, a second branch comprises at least one PMOS transistor, one NMOS transistor, and an NMOS pass device, wherein said current to be measured is flowing through said NMOS pass device and wherein the current through said at least one PMOS transistor and at least one NMOS transistor of the second branch is negligible small compared to the current to be measured, a third branch comprises the same number and type of transistors as said second branch and an NMOS device, wherein each of said transistors of the third branch is forming a current mirror with a correspondent transistor of the second branch and wherein said NMOS device is a replica of the NMOS pass device of the second branch having an n-times smaller size than said NMOS pass device and wherein both said NMOSFET devices are forming a current mirror, and a fourth branch comprises another PMOS transistor conducting the output current of the current sensing system wherein said PMOS transistor of the fourth branch is forming a current mirror with one correspondent transistor of each the third and second branch;

mirror current through said NMOS pass device to said NMOS device of the third branch being a replica of said NMOS pass device;

stabilize the current of said third branch quickly by mirroring this current to the second branch and mirroring back from the second branch to the third branch wherein the current through the current mirror transistors of the second branch is negligible small compared to the current through said NMOS pass device;

mirror the current of the third branch to said PMOS transistor of said fourth branch; and use current of the fourth branch as a linearly correlated measure of the current to be measured of the first branch.

12. The method of claim 11 wherein said NMOS pass device and said NMOS replica are of NMOSFET type.

13. The method of claim 11 wherein said second branch comprises one NMOS transistor, one PMOS transistor and one NMOS pass device.

14. The method of claim 13 wherein said third branch comprises one NMOS transistor, one PMOS transistor and one NMOS device, being a replica of said NMOS pass device of the third branch.

15. The method of claim 11 wherein said NMOS device of the third branch, being a replica of said NMOS pass device, is at least 100-times smaller than said NMOSFET pass device.

16. The method of claim 11 wherein said stabilization of the current of the third branch is performed by mirroring the current to the second branch and back, additionally to the current mirror formed by the NMOS pass device and its replica, wherein these additional mirrors have a same scale.

17. A method to sense the current through an inductor of an integrated buck converter using a PMOS pass device is comprising:

provide a circuitry having four branches, wherein a first branch is conducting the current to be measured, a second branch comprises at least one PMOS transistor, one NMOS transistor, and a PMOS pass device, wherein said current to be measured is flowing through said PMOS pass device and wherein the current through said at least one PMOS transistor and at least one NMOS transistor of the second branch is negligible small compared to the current to be measured, a third branch comprises the same number and type of transistors as said second branch and a PMOS device, wherein each of said transistors of the third branch is forming a current mirror with a correspondent transistor of the second branch and wherein said PMOS device is a replica of the PMOS pass device of the second branch having an n-times smaller size than said PMOS pass device and wherein both said PMOSFET devices are forming a current mirror, and a fourth branch comprises another NMOS transistor conducting the output current of the current sensing system wherein said NMOS transistor of the fourth branch is forming a current mirror with one correspondent transistor of each the third and second branch;

mirror current through said PMOS pass device to said PMOS device of the third branch being a replica of said PMOS pass device;

stabilize the current of said third branch quickly by mirroring this current to the second branch and mirroring back from the second branch to the third branch wherein the current through the current mirror transistors of the second branch is negligible small compared to the current through said PMOS pass device;

mirror the current of the third branch to said NMOS transistor of said fourth branch; and use current of the fourth branch as a linearly correlated measure of the current to be measured of the first branch.

18. The method of claim 17 wherein said PMOS pass device and said PMOS replica are of PMOSFET type.

19. The method of claim 17 wherein said second branch comprises one NMOS transistor, one PMOS transistor and one PMOS pass device.

20. The method of claim 17 wherein said third branch comprises one NMOS transistor, one PMOS transistor and one PMOS device, being a replica of said PMOS pass device of the second branch.

21. The method of claim 17 wherein said PMOS device of the third branch, being a replica of said PMOS pass device, is at least 100-times smaller than said PMOSFET pass device.

22. The method of claim 17 wherein said stabilization of the current of the third branch is performed by mirroring the current to the second branch and back, additionally to the current mirror formed by the PMOS pass device and its replica, wherein these additional mirrors have a same scale.

* * * * *